Feb. 27, 1951 H. J. NACHOD 2,543,048

PHOTOCELL

Filed Oct. 5, 1946

INVENTOR.
Henry J. Nachod
BY
Percy P. Lantzy
ATTORNEY

Patented Feb. 27, 1951

2,543,048

UNITED STATES PATENT OFFICE 2,543,048

PHOTOCELL

Henry J. Nachod, East Orange, N. J., assignor to Federal Telephone and Radio Corporation, New York, N. Y., a corporation of Delaware Application October 5, 1946, Serial No. 701,458

6 Claims. (Cl. 136—89)

The present invention relates to photocells and, more specifically, to an improved photocell disk which is centrally contacted and supported and which has a viewing aperture therethrough.

Barrier-layer photocells of the flat disk type are ordinarily provided with an annular metal ring sprayed or otherwise applied to the rim of the translucent front electrode, and conductive contact is made with external circuits through this ring. Maintaining contact with the front electrode by such an arrangement not only imposes electrical problems but mechanical or mounting problems as well. Certain of the disadvantages of this arrangement may, however, be avoided by central contact and support of the photocell disk, a structure which is especially suitable for use with photocells converted from rectifier disks since these are conveniently distinguished by a center aperture. In accordance with this invention, the central mounting and contacting structure includes a viewing aperture extending through it such that orienting the sensitive surface of the photo-cell disk to the optimum position may be facilitated by observing the desired light source through the aperture.

One object of the present invention therefore is to provide an improved center-contact photocell unit.

A second object is to provide a centrally contacted and supported disk-like photocell having a viewing aperture therethrough.

Another object of the invention is to provide a photocell unit having a combination contacting, mounting, and viewing structure centrally associated with the photocell disk.

A further object is to provide a barrier-layer photocell unit having an improved pressure-contacting electrode, central mounting arrangement, and a centrally-located light-transmitting aperure.

Still further it is an object to provide a selenium photocell unit structure which makes advantageous use of center-aperture photocell disks and through which light may be transmitted.

Figure 1:
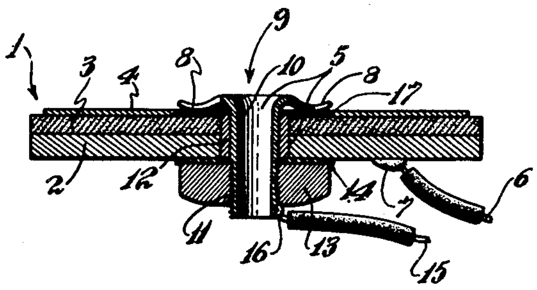
Figure 2:
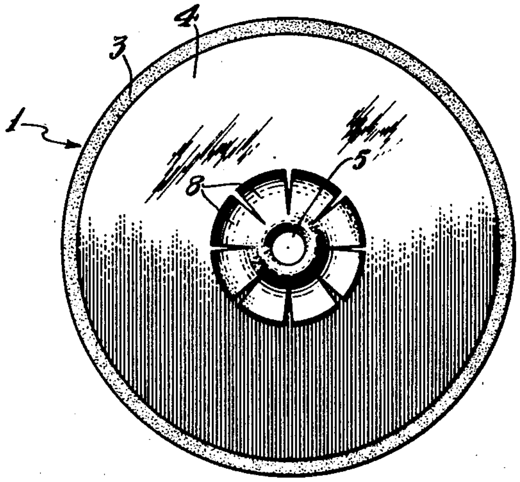

The foregoing and other additional objects and features are disclosed in greater detail by the following description and discussion of a preferred embodiment of the invention, particular reference being had to the drawings, in which:

Figure 1 is a half-sectional side view of one photo-cell unit constructed in accordance with this invention; and Figure 2 is a top view of the photocell unit of Figure 1.

The selenium photocell disk generally designated by numeral 1 in both figures comprises a conductive baseplate 2, a semi-conductor layer such as selenium 3 thereon, and a translucent front electrode coating 4 covering the semi-conductor layer. In accordance with the preferred embodiment of this invention, the conductive baseplate is made of nickel-plated iron or steel, although other equivalent metals of course may be used if preferred, and the semiconductive front electrode coating is an alloy having a low melting point such as an alloy of cadmium, tin and bismuth, which may be applied to the semiconductor layer by spraying, sputtering, etc. as is common practice in the art to which the invention relates. A central aperture 5 appears in this disk and is typical of photocell disks converted from selenium rectifier plates, by the method disclosed and claimed in my copending application, Serial No. 681,064, filed July 2, 1946 which is now abandoned. Electrical contact may be maintained with the baseplate electrode 2 through conductor 6 soldered to that electrode at 7. While the thickness of layers 3 and 4 have been enlarged for clearness of illustration, it will be understood that in practice the thickness is quite thin and layer 4, for example, may comprise a thin film only.

Electrical connection with the front electrode 4 is secured through pressure contacts between the electrode 4 and the flared resilient portions 8 of the hollow conductive terminal or holder 9. Terminal 9 consists of the flared portions 8, a hollow stem 10 extending through the disk aperture 5, and a threaded section 11. An insulating sleeve 12 prevents electrical contacting of the stem 10 with those portions of the semi-conductor 3 or baseplate electrode 2 which are adjacent aperture 5. A nut 13 engages the threaded section 11 of the terminal 9 and may be positioned to produce the desired pressure contact between the resilient flared portions 8 and front electrode 4. The insulating washer 14 interposed between metallic nut 13 and baseplate electrode 2 prevents shorting of this electrode with conductive terminal or holder 9. The assembly also includes a second conductor 15 soldered at 16 to the terminal 9 through which it makes contact with the front electrode 4. An insulating washer 17 is shown positioned between the front electrode 4 and the semi-conductor layer 3 at those places where there is a possibility of the front electrode becoming shorted with the baseplate electrode 2 due to the pressure exerted by the resilient flared portions 8 of terminal 9.

Since terminal 9 is constructed with a hollow stem, light may pass through it from a light source on one side of the photocell disk to an observer or equipment positioned on the other side of the disk. This feature is of special importance in certain photocell applications. When utilized in exposure meters, for example, the photocell unit of this invention enables the observer to view through the tubular stem the scene of which the illumination intensity is to be measured. The viewing aperture through the tubular stem is centrally and permanently positioned with respect to the disk such that, when the aperture is at any location directed so that an observer may view a particular scene, the photocell disk is simultaneously oriented to the optimum position for receiving illumination from the scene thus viewed.

The extent of use of this photocell unit is not limited to exposure meter applications nor to systems in which a human observer is required. Such a unit may be mounted concentrically with the lens of a camera or other optical equipment and such optical equipment may even have components such as lenses or filters mounted internal to the hollow terminal 9. Although the embodiment described preferably utilizes a circular flat selenium photocell, it should be apparent that any suitable shape or type of photocell may be similarly incorporated into a photocell unit such as herein discussed.

Other minor changes may well be instituted, depending on special photocell requirements. For example, insulating washer 17 may not be deemed necessary or may be positioned between the baseplate and selenium layer, the combination of the insulating washer 14 and metallic nut 13 be replaced by a nut made of insulating material, the flanged resilient portions 8 may have any desired configuration, and conductors 6 and 15 may be electrically connected to baseplate 2 and terminal 9 respectively in any convenient manner.

Thus it should be clear that there are numerous changes which may be made in the above-described preferred embodiment without departing from either the principles or scope of the invention encompassed herein.

I claim:

1. A photocell unit that comprises a disk type baseplate electrode having an aperture therethrough, a layer of light-responsive semi-conductive material coating one side of said electrode, a translucent conductive front electrode substantially covering said layer, a hollow conductive member having an opening extending therethrough mounted in said aperture and permitting light to be transmitted through said member in a direction substantially normal to the light-responsive surface of said semi-conductive layer, said member having a resilient radially-extending end adapted to contact said front electrode, and means for varying the pressure of said radially-extending end on said front electrode.

2. A photocell unit having a light transmitting aperture therethrough that comprises a disk-shaped conductive baseplate electrode having a substantially centrally located aperture therethrough, a layer of light-responsive semi-conductive material coating one side of said electrode, a translucent conductive front electrode substantially covering said layer, and conductive means extending through said aperture, electrically contacting said front electrode and rigidly supporting said disk, said means comprising a tubular element open at the ends having a viewing channel extending axially therethrough in a direction substantially normal to the light-responsive surface of the semiconductive layer permitting light to be transmitted through said channel.

3. A selenium photocell unit having a light-transmitting aperture therethrough that comprises a disk-shaped conductive baseplate electrode having a substantially centrally located aperture therethrough, a layer of selenium coating one side of said electrode, a translucent conductive front electrode substantially covering said layer, a tubular conductive member extending through said aperture such that light may be transmitted therethrough, said member having a resilient radially-extending end adapted to contact said front electrode, means insulating said member from said baseplate electrode and said layer of selenium, and means for varying the contact pressure between said resilient end and said front electrode.

4. A selenium photocell unit that comprises a disk-shaped conductive baseplate electrode having a substantially centrally located aperture therethrough, a layer of selenium coating one side of said electrode, a translucent front electrode substantially covering said layer, a tubular conductive member extending through said aperture such that light may be transmitted therethrough, said member having a resilient radially-extending end adapted to contact said front electrode and an opposite end externally threaded, means insulating said member from said baseplate electrode and said layer of selenium, a nut adapted to engage the threaded end of said member, bear non-conductively against said baseplate electrode, and vary the contact pressure between said resilient end and said front electrode, and terminal conductors electrically connected with said baseplate electrode and said conductive member.

5. A photocell unit that comprises a photocell disc comprised of a conductive base plate, a semiconductor layer thereon and a translucent front electrode coating covering the semi-conductor layer thereon, said disc having an aperture therethrough, a hollow conductive member open at the ends contacting the front electrode of said disc, extending through said aperture, and permitting light to be transmitted through said member in a direction substantially normal to the active surface of the photocell disc, and means for varying the pressure of said member on said front electrode and for maintaining said member in operative relationship with said disc.

6. A photocell unit that comprises a photocell disc comprised of a conductive base plate, a semiconductor layer thereon and a translucent front electrode coating covering the semi-conductor layer, said disc having an aperture therethrough, a hollow conductive member open at the ends contacting the front electrode of said disc, extending through said aperture, and permitting light to be transmitted through said member in a direction substantially normal to the active surface of the photocell disc, and means for maintaining said member in operative relationship with said disc.

HENRY J. NACHOD.

REFERENCES CITED

The following references are of record in the file of this patent:

UNITED STATES PATENTS

| Number | Name | Date |
|---|---|---|
| 1,912,653 | Olson | June 6, 1933 |
| 2,015,431 | McIlvaine et al. | Sept. 24, 1935 |
| 2,039,230 | Lamb | Apr. 28, 1936 |
| 2,172,200 | Hein | Sept. 5, 1939 |
| 2,379,374 | Payne | June 26, 1945 |
| 2,403,863 | Lamb | July 9, 1946 |
| 2,406,139 | Fink et al. | Aug. 20, 1946 |